Figure 1:
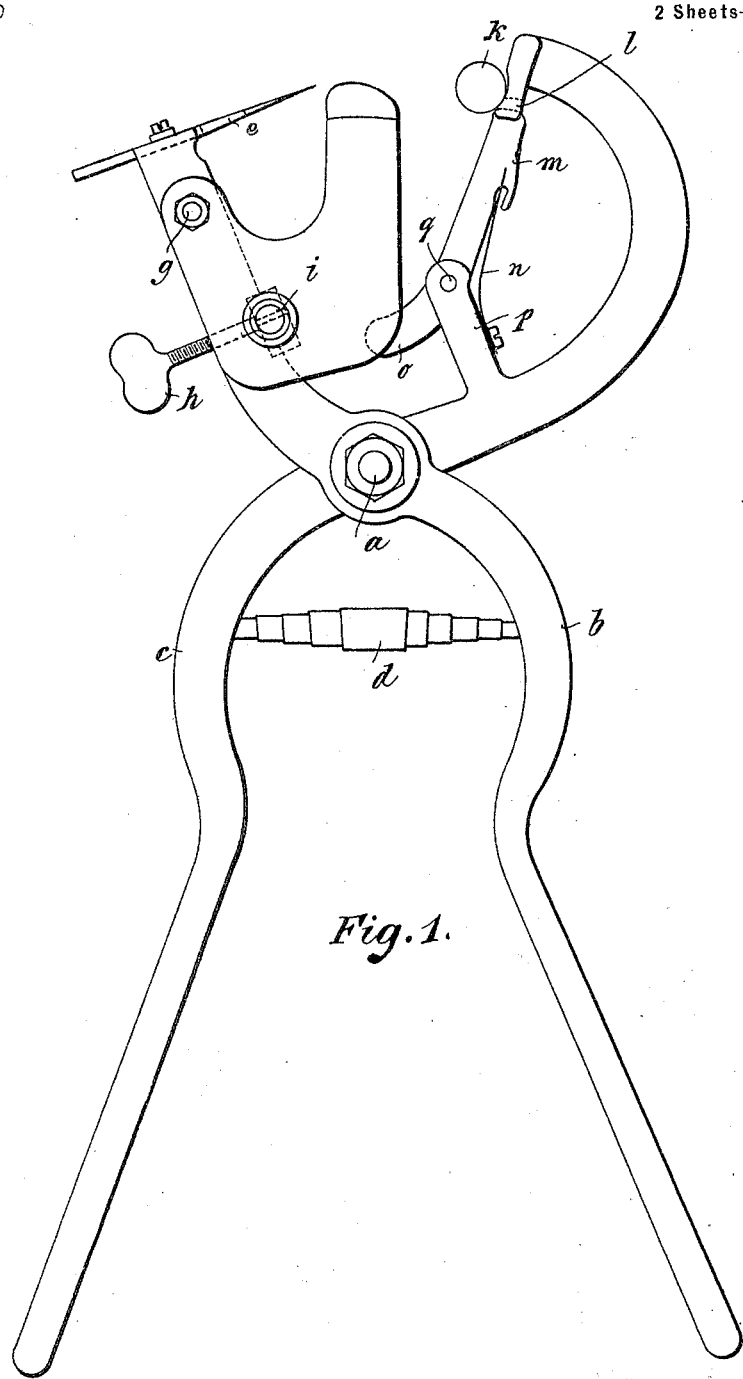

No. 690,086. Patented Dec. 31, 1901.
F. J. E. VOLLSTEDT.
BUDDING NIPPERS OR TONGS.
(Application filed Feb. 1, 1901.)
(No Model.) 2 Sheets—Sheet 1.

Witnesses:
Frank S. Ober
Waldo M. Chapin

Inventor
Friedrich J. E. Vollstedt
by M. J. Rosenbaum
atty.

No. 690,086. Patented Dec. 31, 1901.
F. J. E. VOLLSTEDT.
BUDDING NIPPERS OR TONGS.
(Application filed Feb. 1, 1901.)
(No Model.) 2 Sheets—Sheet 2.
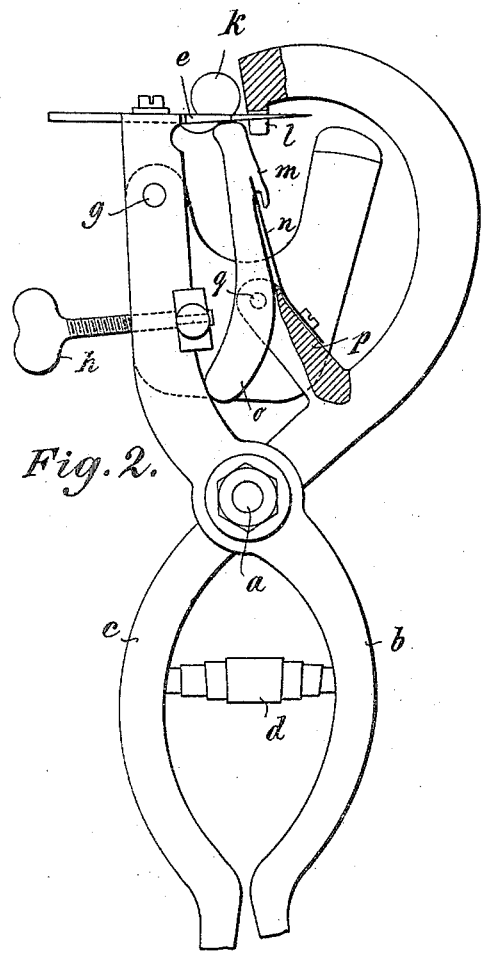
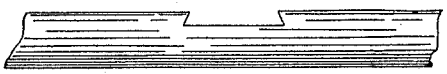
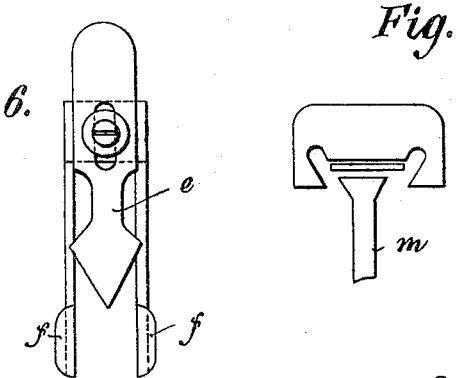

United States Patent Office.

FRIEDRICH JOHANN ELIAS VOLLSTEDT, OF HUSUM, GERMANY.

BUDDING NIPPERS OR TONGS.

SPECIFICATION forming part of Letters Patent No. 690,086, dated December 31, 1901.

Application filed February 1, 1901. Serial No. 45,540. (No model.)

*To all whom it may concern:*

Be it known that I, FRIEDRICH JOHANN ELIAS VOLLSTEDT, a subject of the King of Prussia, Emperor of Germany, residing at Husum, in the Kingdom of Prussia and Empire of Germany, have invented certain new and useful Improvements in Budding Nippers or Tongs, of which the following is a full, clear, and exact description.
This invention relates to cutting-nippers or tongs which are designed to simplify and facilitate the work of budding plants, success being insured when my improved nippers or tongs are employed. By this means special budding cuttings or shields and budding recesses are obtained, in which operations the nippers or tongs make dovetailed cuts in the branch and stock, respectively.

The simplification and improvement in budding above mentioned are effected according to my invention by making two lateral inclined cuts or incisions in the side of a wild stock by means of two inclined knives and making the separating cut by means of a longitudinally-cutting knife in such a manner that two wood abutments or shoulders are left without any risk of splitting the wood beneath the said abutments or shoulders, so as to loosen them. Into the recess so formed there is then slid laterally a bud or eye shield cut from the flower or fruit-bearing plant by means of the same nippers or tongs, so that the said shield fits exactly into the recess in the stock for receiving the bud and does not require to be held by hand during binding.

My improved device is shown in the accompanying drawings, in which—

Figure 1 shows the cutting nippers or tongs open in side elevation; and Fig. 2 is a similar view, partly in section, showing the said nippers or tongs closed. Figs. 3 and 4 are side elevations taken at right angles to each other, showing the stock with a recess formed by means of my improved device. Figs. 5 and 6 show details of construction. Figs. 7 and 8 show the shields or pieces cut out by means of my improved device.

The nippers or tongs comprise double-armed levers *b* and *c*, which turn about a pin or bolt *a*, as shown, and the lower arms or handles thereof are moved apart by a spring *d* in a known manner. On the upper arm of the lever *b* is arranged a knife *e*, which is of the shape shown in Fig. 6. The recesses in the knife increase the cutting power. On the lever *b* are also mounted the knives *f* and *f'*, which make the lateral cuts in the stock. These lateral knives *f* and *f'* can be turned about an axis *g*, which is carried by the tongs-lever *b*. The position of the lateral knives *f* and *f'* can be adjusted by means of the adjusting-screw *h*, which passes through the back of the tongs-lever *b* and extends through and moves in the bolt or pin *i*. The bolt or pin *i* also serves for holding the lateral knives evenly apart. For this purpose the bolt *i* is provided with screw-nuts at its ends. By thus enabling the lateral knives *f* and *f'* to be turned about the axis *g* it is possible to arrange them in such a position that they always cut somewhat deeper into the wood than the cutting-plane of the upper knife *e*, so as to prevent any risk of the wood at the outer sides being afterward split by the said knife *e*.
The tongs-lever *c* serves, in the first place, for conveniently supporting the stock *k* to be budded as well as during the cutting for automatically punching out the cut-out piece on closing the tongs. For the former purpose the upper arm or end of the tongs-lever is somewhat hollowed out and has a notch or recess *l*, Figs. 2 and 5, so that the knife on cutting through the stock to be budded will not abut onto a hard surface. In the tongs-lever *c* there is also mounted a lever *m*, which is acted on by a spring *n*. In closing the tongs the shorter arm or end *o* of the double-armed lever *m* (the axis *q* of which turns in the bearing-bracket *p*) strikes against the tongs-lever *b*. Consequently the longer end of the double-armed lever *m* moves to the left and pushes out the dovetail-shaped piece cut from the stock to be budded.

The branch of the plant to be budded in is cut with exactly the same nippers or tongs, so that it can be pushed exactly into the dovetail-shaped recess in the stock to be budded. Figs. 3 and 4 show the form of the recess cut, one view showing the recess in plan and the other from the side.

Figs. 7 and 8 show two shields cut from flower or fruit bearing stock, one seen in plan and the other from the side. These eye-shields fit exactly into the budding-recess in the stock. (Shown in Figs. 3 and 4.)

What I claim, and desire to secure by Letters Patent of the United States, is—

1. In budding nippers or tongs, the combination of a pair of jaw-levers pivoted together, knives adapted to cut a block or section in the wood and a lever moved by the jaws to remove or push out the cut block or section.

2. In budding nippers or tongs such as are hereinbefore described, a device for pushing out the dovetail-shaped piece cut out by the knives, comprising a two-armed lever pivoted upon one jaw of the tongs and actuated by the other, the upper end of the said lever $n$, in closing the tongs, pushing the cut piece out of the branch or stock, substantially as set forth.

In witness whereof I subscribe my signature in presence of two witnesses.

FRIEDRICH JOHANN ELIAS VOLLSTEDT.

Witnesses:
GOTTLIEB JAHN,
CARL SCHEINBERGER.